G. H. & J. H. PERKINS,

G. H. PERKINS, assignee of J. H. PERKINS, dec'd.

Metallic-Can.

No. 8,744. Reissued June 10, 1879.

Attests.

John Dolley Jr

Inventors

George H. Perkins,
Sarah Ann Jane Perkins
Administratrix of Estate of
James H. Perkins deceased, By their Attorneys, { W. C. Strawbridge
J. Bonsall Taylor

N. PETERS, PHOTO-LITHOGRAPHER, WASHINGTON, D. C.

UNITED STATES PATENT OFFICE.

GEORGE H. PERKINS, OF PHILADELPHIA, PENNSYLVANIA, ASSIGNEE, BY MESNE ASSIGNMENTS, OF JAMES H. PERKINS, DECEASED.

IMPROVEMENT IN METALLIC CANS.

Specification forming part of Letters Patent No. 187,902, dated February 27, 1877; Reissue No. 8,659, dated April 8, 1879; Reissue No. 8,744, dated June 10, 1879; application filed May 16, 1879.

*To all whom it may concern:—*

Be it known that GEORGE H. PERKINS and JAMES H. PERKINS, both of the city and county of Philadelphia in the State of Pennsylvania, have jointly invented a new and useful Improvement in Metallic Cans, of which the following specification is a full, clear, and precise description, and sufficient to enable others skilled in the art to which our improvement appertains to comprehend and construct it, reference being had to the accompanying drawings, which form part of this specification.

The invention relates to the class of hermetically-sealed cans for paints, preserves, and the like; and has for its object a cheaply-constructed can, which, although sealed by means of solder, can yet be easily opened without section.

The invention consists of certain structures which are stated in the claims at the close of this specification.

In order that these structures may be fully understood we have represented in the accompanying drawings and will proceed to describe various forms of cans representing our invention; each figure of said drawings being a partial central section of a can.

Figure 1:
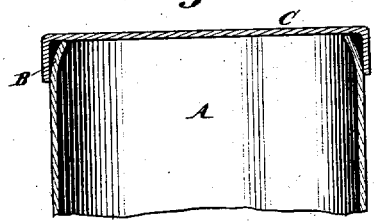

In the drawings, A represents the body of a can, constructed by any usual method, and slightly beveled inward around its top portion as indicated by B. Figures 1. 2. 3. 4. 7. and 8, and at F, Figs. 5 and 6, so as to form a contracted mouth or chine of smaller external diameter than the diameter of the walls of the body of the can.

C is a common flanged cover, fitting over the body; the flange being either straight or curved in section. The internal diameter of this cover is as great as the external diameter of the body of the can or the shoulder thereof below the said contracted mouth or chine, and the depth of its rim is sufficient to enable its lower edge to come into close contact with the body upon a circumferential line below the contracted mouth or chine, around which line frangible solder is applied to secure the cover.

By consulting the drawings, it will be seen that, in consequence of the contraction of the mouth or chine and the greater diameter of the cover, an annular space is left between and formed by the inner angular circumference of the flanged cover and the exterior of the contracted mouth or chine of the can.

When it is desired to open the can, blows directed against the outer edge of the cover act upon the two right-angled sides of the cover forming the triangular portions bounding the annular space, to drive such sides out of right and into obtuse angle, one of which sides, being the top of the cover, resists movement more than the other, or flange, the latter is therefore forced sharply down the can-body, almost instantly cracking the line of solder that alone opposes its descent.

Successive blows at points around the circumference of the cover crack the solder, and enable the removal of the cover.

It will be readily comprehended that as the cover is struck the rim of the contracted mouth or chine may be slightly bent or compressed inward, permitting by its own bending a slight descent to the outer circumference of the cover, and thereby the readier downward movement of the flange of the cover.

In Fig. 1 the contracted mouth is formed by a simple internal beveling, and the flange of the cover is right-angular.

Figure 2:
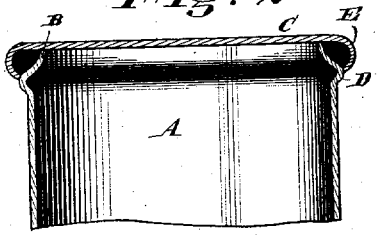

In Fig. 2 the flange of the cover is somewhat hooked in section, as indicated by E, and a shoulder swelling or corrugation, D, is worked into the body immediately below the bevel which produces the contracted mouth, the contact-line of the cover and can-body being between the summit of the corrugation and the extreme bottom edge of the flange of the cover.

Blows in this structure not only tend to flatten out the angular edge of the cover, but as the top surface of the cover forces the beveled chine inward, the tendency is to bulge the corrugation D. out, thus materially aiding to crack the solder-seam.

This form has also the advantage of permitting the can, when filled, to be turned upside down before soldering, for the readier application of the soldering-iron, and this for the reason that the arched form of the flange makes it sufficiently tenacious in its hold to cling tightly to the body, when expanded by being pressed up to or upon the summit of the corrugation.

Figure 3:
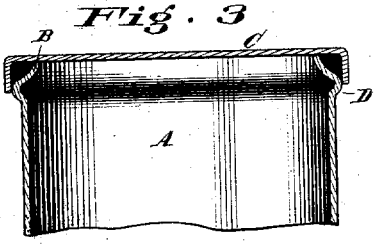
Figure 4:
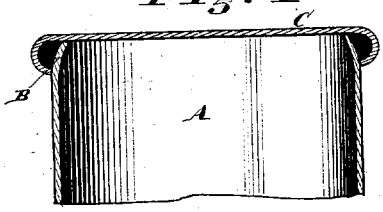

As modified forms however, the right-angular cover shown in Fig. 1 may be applied to the body shown in Fig. 2, forming Fig. 3, while the hooked cover of Fig. 2 may be applied to the body of Fig. 1, forming Fig. 4, without altering in any manner our invention, as set forth.

In all these figures the action of the parts in opening is substantially the same.

It will be readily understood that, in hammering to open these cans, it sometimes results that the rim of the contracted mouth does not yield to any appreciable extent, but that fracture of the solder occurs solely by the downward movement of the flange of the cover and of such peripheral portion of the cover as overlaps the drawn-in edge of the bevel or contraction; while, on the other hand, fracture may be due to the crushing down of the beveled portion, which may occur independently of the bending of the flat surface of the cover when the flange is driven downward, or both actions may occur conjointly and to any relative extent; but the essence of this invention lies in such contraction of the mouth or chine of the can relatively to the size of the body of the can, and to the size of the cover, that while the flange of the cover is large enough to slip down over the body of the can or the part thereof with which the lower edge of the flange is in contact, this flange is separated from the rim of the mouth or chine of the can by an annular space, the result of which relationship of parts is that when blows are applied to the rim of the cover the flange thereof slips down over the part of the body of the can with which its lower edge is in contact.

Figure 5:
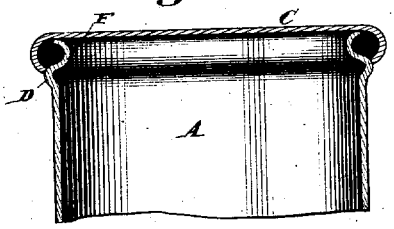
Figure 6:
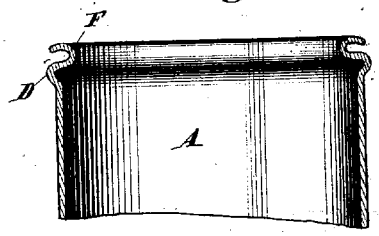

In Fig. 5 the beveling for contraction assumes the form of an internal corrugation F, constituting a strictly-compressible chine, which flattens down upon itself in opening, as shown in Fig. 6, and has the advantage of leaving a very smooth surface for the brush to be drawn against.

Figure 7:
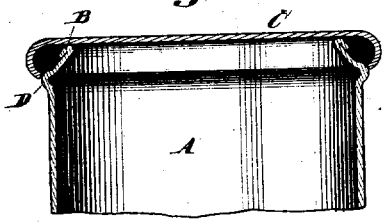
Figure 8:
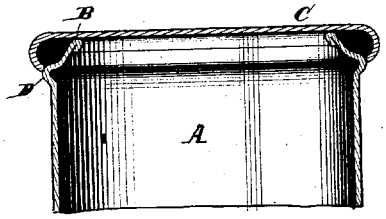

In Figs. 7 and 8, which are modifications of Fig. 2, the rim of the contracted mouth is hemmed so as to render it smooth for the brush.

The advantages are:—The extreme simplicity of the can, and the cheapness with which it can be made; the close original contact of the parts to be united by solder, affording no crevices for the irregular distribution of the solder; facility of opening; and the evenness of both edges after opening.

Having thus described our invention, we claim and desire to secure by Letters Patent of the United States:

1.—A sheet-metal can constructed with a contracted mouth or chine and fitted with a flanged cover whose periphery is as great as that of the sides of the can below its contracted chine, whereby an annular space is formed between the exterior of the said chine and the interior of the flanged cover, and the can is adapted for ready opening by a blow which forces the flange of the cover down along the sides of the can with which its lower edge is in contact.

2.—A sheet-metal can constructed with a contracted mouth or chine and fitted with a flanged cover whose periphery is as great as that of the sides of the can below its contracted chine, and is united at its lower edge with the body by frangible solder, whereby an annular space is formed between the exterior of the said chine and the interior of the flanged cover, and the can is adapted for ready opening by a blow which breaks said solder and forces the flange of the cover down along the sides of the can with which its lower edge is in contact.

3.—A sheet-metal can, the upper chine of whose body is provided with or formed into a yielding or compressible bevel, B, and whose cover rests upon said yielding bevel, and is united to the body below the same by frangible solder, to the end that blows properly applied to the cover will compress the yielding portions, and permit the descent of the cover, so as to rupture its frangible joint, substantially as described.

4.—A sheet-metal can, the chine of whose body is provided with or formed into a yielding or compressible bevel B, in combination with an exterior circumferential swelling D, and whose cover rests upon said yielding bevel B, and is united upon the summit of the swelling D, to the body by frangible solder, to the end that blows properly applied to the cover will compress the yielding portions of the body, permit the descent of the cover to rupture its frangible joint, and will further bulge the corrugation D, to aid in said rupture, substantially as described.

GEORGE H. PERKINS.
SARAH ANN JANE PERKINS,
*Administratrix of estate of James H. Perkins, deceased.*

Witnesses as to Sarah Ann Jane Perkins:
W. C. STRAWBRIDGE,
J. BONSALL TAYLOR.

Witnesses as to signature of George H. Perkins:
LLEWELLYN W. BOSWELL,
HENRY WARDEN.